United States Patent [19]
Wilkinson et al.

[11] Patent Number: 4,519,004
[45] Date of Patent: May 21, 1985

[54] EXTENDED PLAY VIDEODISC

[75] Inventors: Richard L. Wilkinson, El Toro; Gary M. Giddings, Laguna Hills, both of Calif.

[73] Assignee: Discovision Associates, Costa Mesa, Calif.

[21] Appl. No.: 384,140

[22] Filed: Jun. 1, 1982

[51] Int. Cl.³ .............................................. H04N 5/76
[52] U.S. Cl. .................................... 358/342; 358/313
[58] Field of Search ............... 358/335, 342, 312, 313; 360/10.1, 11.1

[56] References Cited

U.S. PATENT DOCUMENTS 4,298,896 11/1981 Heitmann ....................... 360/11.1 X Primary Examiner—Robert L. Richardson
Attorney, Agent, or Firm—Ronald J. Clark

[57] ABSTRACT

An extended play videodisc and a method and apparatus for playing it. The disc carries every m th segment of a video program and the segments are repeated m times to approximate the original program. Prior art extended play discs have contained every other frame or every third frame of video, but the repeating of an entire frame results in poor motion reproduction and flickering scene transitions. The present invention preferably includes the repeating of a field of video an odd number of times. The fields are preferably arranged in order on the disc with n fields per revolution, the disc being rotated such that a new field is read every one and 1/n th revolution of the disc. The new segment is preferably read during the final repeating of the previous segment.

21 Claims, 17 Drawing Figures

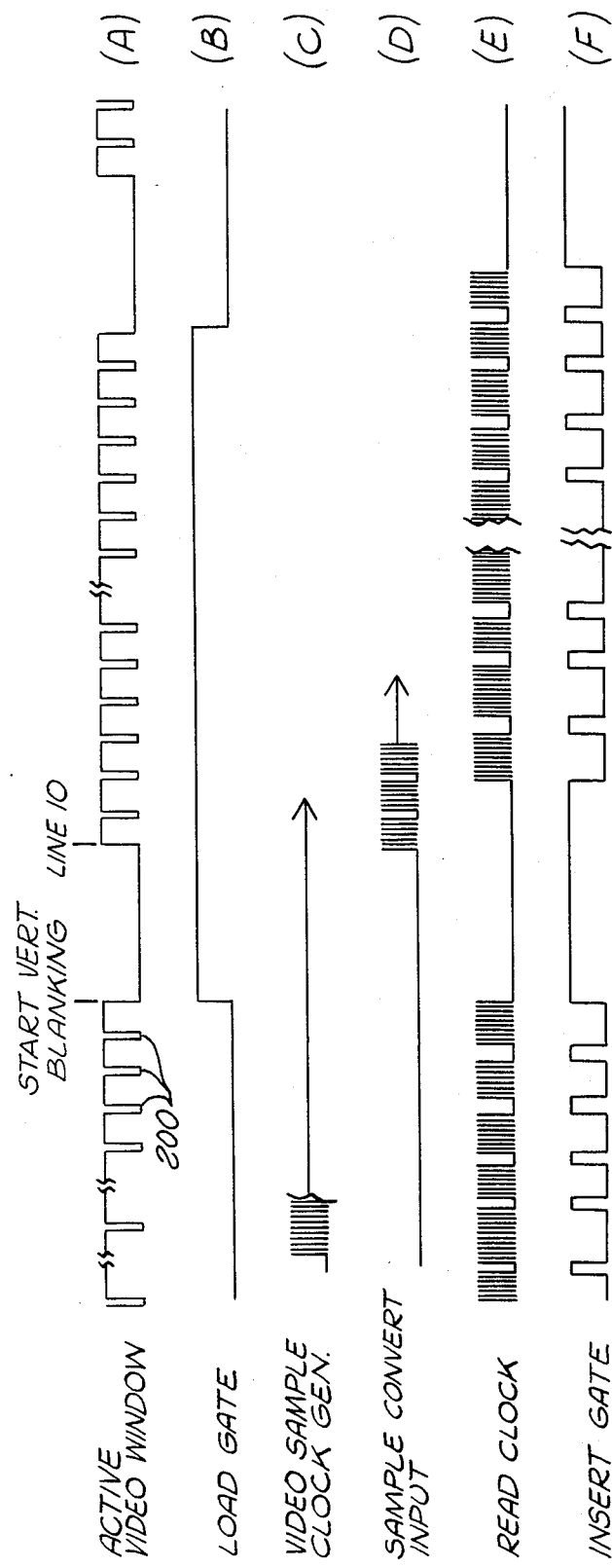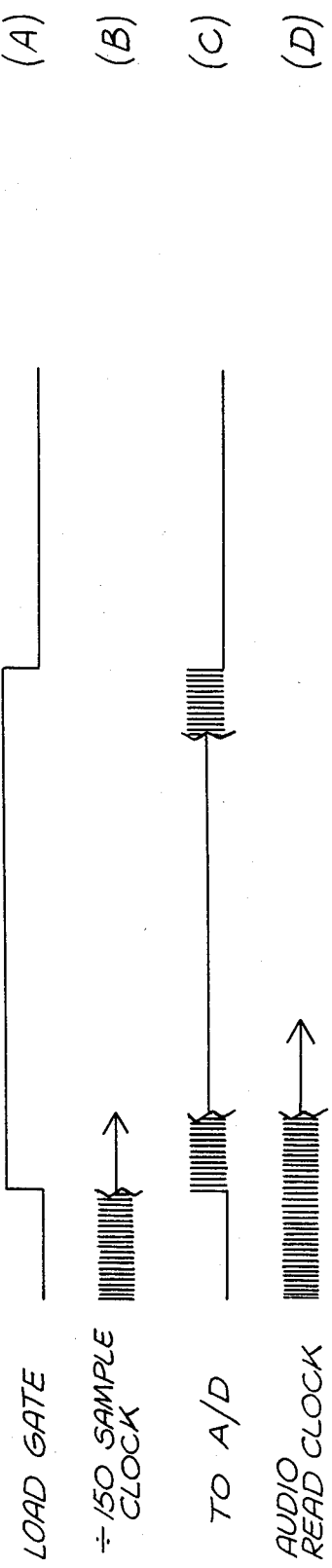

EXTENDED PLAY VIDEODISC

BACKGROUND OF THE INVENTION

1. Field of the Invention

The present invention relates to video recording and playback, and more particularly relates to video recording discs and their playback.

2. Background Art

The videodisc is a storage medium for video information, on which video signals are recorded as spiral or circular tracks of indicia which are readable by way of electrical, optical, or other means. Videodiscs, in particular optical videodiscs which are readable optically by way of an imaged beam of laser light, offer enhanced playback flexibility as compared with video tape. To cite just one example, a videodisc player can be programmed to "search" for a particular frame or field of video, and that search can be effected quite rapidly as the imaged beam of laser light is easily moved in a radial direction across the full span of a disc much more rapidly than a video tape can be cycled from beginning to end even in a fast forward or fast reverse mode.

One limitation imposed by the videodisc, however, at the present level of technology, is in the amount of video information which can be stored on one "side" of a disc. Current optical videodisc standards provide for 54,000 circular or spiral tracks on a disc, with the innermost, limiting track carrying no more than two fields of video. Constant angular velocity ("CAV") discs, which are rotated at a constant angular velocity as they are played, carry two fields of video in each of the 54,000 tracks. Constant linear velocity ("CLV") discs, which are played at a varying angular velocity such that the linear velocity of the reading spot of light along any track on the disc is constant, carry a varying number of fields of video on each track, varying from two on the innermost track to six on the outermost track. The maximum permissable play time for a CLV disc is approximately one hour per side, while for a CAV disc the play time is limited to approximately one half hour per side.

Arrangements have been proposed to extend the play time of videodiscs. For example, U.S. Pat. No. 3,908,080, entitled "Method of Making an Extended Play Videodisc Record", which issued on Sept. 23, 1975 to Kent D. Broadbent, describes a system wherein only one of the video frames of a consecutive plurality of frames is recorded on a videodisc. The sound associated with the recorded video frame and with the omitted video frames is multiplexed and written on the disc track along with the recorded frame. On playback, the recorded frame is read repeatedly by the player a sufficient number of times to substitute for the omitted frames and each repeat is accompanied by the sound corresponding to the omitted frames, in proper sequential order. The system disclosed in the '080 patent provides a system by which the play time of a videodisc may be extended by a factor of two, three or more times. The system lends itself particularly well to applications wherein one frame is recorded on each spiral track revolution of the videodisc. In this way, the mechanics of repeating a single frame is rendered relatively simple, utilizing the standard technique of "freeze frame" videodisc playback.

However, the '080 patent system has limitations. For example, since whole frames are dropped, the maximum motion update rate is 15 per second. This gives marginal motion fidelity. In addition to this, whenever Field 1 and Field 2 of the frame being repeated are different, the transition between the fields is seen the same number of times the frame is repeated, exaggerating the jerking motion.

The present invention solves these problems, while permitting up to ⅔ of the video signals to be omitted, thus giving three times the normal play time for a videodisc.

SUMMARY OF THE INVENTION

The present invention resides in an improved long-play videodisc having a disc base of the type suitable for the recording thereon of spiral or circular tracks of indicia representing video signals. The disc base has recorded thereon a plurality of fields of video in each track revolution, each field being noncontiguous with each of the said fields adjacent thereto. The disc is played by reading a field of video, storing it, and playing it repeatedly a plurality of times.

The present invention is particularly useful in connection with a videodisc wherein bandwidth compressed video is recorded thereon such that four fields of video are recorded on each track, and wherein those fields comprise one out of every three fields of video from a standard segment of video. This arrangement allows for an expansion of the play time of a videodisc by a factor of six, thus permitting up to three hours of video program material to be recorded on a single side of a constant angular velocity disc. A novel arrangement permitting the playback of such a disc is disclosed herein.

Providing fields generally noncontiguous with each of their adjacent fields recorded therewith, and in particular replaying one out of every "N" field only of an otherwise standard segment of video, provides improved performance as compared with systems which provide complete frames taken from such otherwise conventional video. For example, such single-field repetition gives motion smoothness superior to repeatframe systems. Comparing a one out of three skip field with a one out of two skip frame system, the basic motion sampling rate of the skip field system is twenty times per second, as compared with fifteen times per second for the skip frame system. In addition, any transition between dissimilar fields is seen only once with the skip field system, preventing the fluttering motion discontinuity which is possible with the repeatframe system. The price for this improved motion fidelity would normally be a decrease in vertical resolution. However, in the one out of three skip field system, recorded fields alternate between "ODD-field" scan lines and "EVEN-field" scan lines, thus retaining information covering the entire normal TV vertical resolution. In a continuous running display, "full resolution" and "half resolution" frames will thus alternate, providing on the average, a twenty-five percent reduction in vertical resolution. As will be evident later in this description, this is the result of the fact that each field is displayed three times in a row. Therefore, every other displayed frame has two like fields, and every other intervening displayed frame has two different fields.

It will be appreciated from the foregoing that the present invention represents a significant advance in the field of videodisc recording and reproducing systems. In particular, it provides a convenient technique for increasing the effective storage capacity of a recording disc without substantial loss in reproduction fidelity.

Other aspects and advantages of the invention will become apparent from the following more detailed description, taken in conjunction with the accompanying drawings.

BRIEF DESCRIPTION OF THE DRAWINGS

FIGS. 4(A)–(F) are signal diagrams of several signals generated by the circuits shown in FIG. 3.

FIGS. 5(A)–(D) are signal diagrams of further signals generated by the circuits shown in FIG. 3.

DETAILED DESCRIPTION OF THE PREFERRED EMBODIMENT

Figure 1:
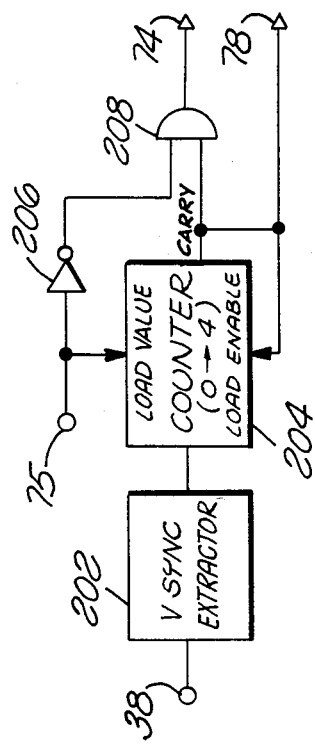
FIG. 1 is a diagram depicting the arrangement of fields on a videodisc constructed according to the preferred embodiment of the present invention.

The preferred embodiment of the present invention involves the use of a CAV optical videodisc, in which four fields of video are stored on each spiral track. FIG. 1 is a diagram showing the arrangement of fields on such a videodisc 10. The disc 10 is conventional in all aspects except for the arrangement of the video information on the recording surfaces thereof. Thus, the disc has a central aperture 12 of conventional dimensions, and an annular recording surface on each side which extends from an inner circular boundary 14 to an outer circular boundary 16 near the edge of the disc 10. The disc 10 is played such that the reading spot of laser light advances around the disc in the direction depicted by arrow 18.

A standard, conventional CAV optical videodisc has two fields per revolution of the spiral track and is rotated at a rate of approximately 1800 RPM. This results in the video information being read off the disc at standard NTSC rate. In order to read the disc 10 of the preferred embodiment of the present invention at a rate which would cause the video information to be read off at standard NTSC rate, the disc rotation rate would be approximately 900 RPM. However, according to the principles of the present invention, the disc 10 is rotated at a rate of approximately 1500 RPM.

Figure 2:
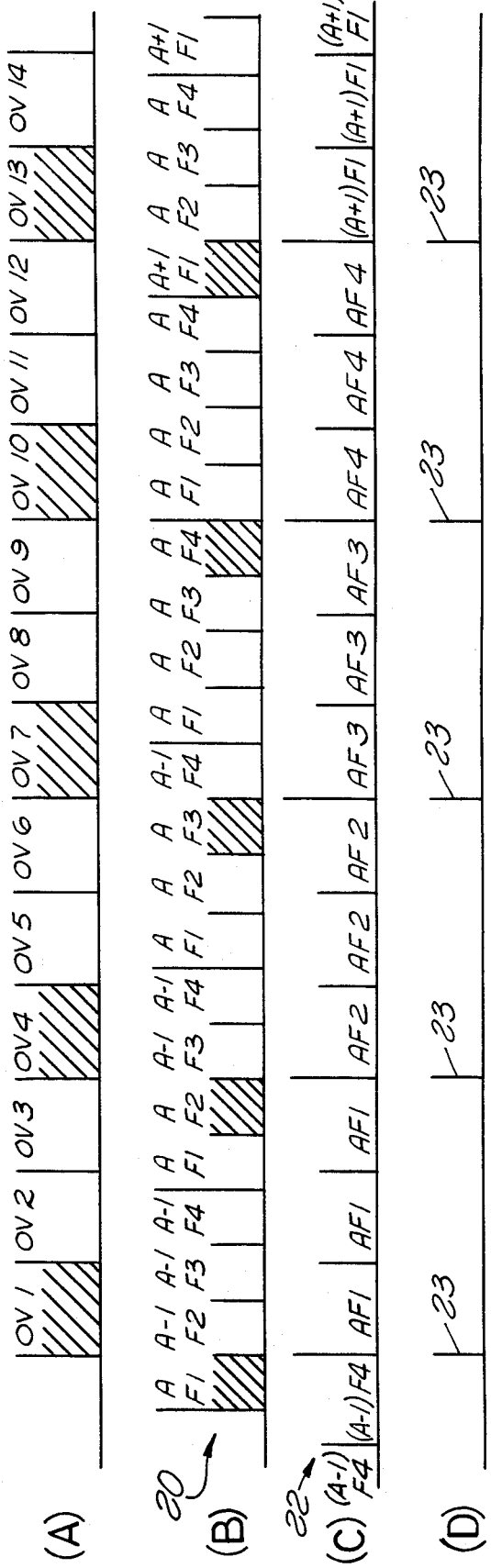
FIG. 2 consisting of (A)–(D), is a diagram showing the arrangement in time of fields of video as they are read off of the disc shown in FIG. 1 as compared with the arrangement of fields of such video as they are replayed for viewing on a monitor or receiver.

The reason for this difference is explained by reference to FIG. 2, which is a diagram showing the relationship between original fields of video selected (FIG. 2(A)), fields of video scanned on the disc (FIG. 2(B)), fields of video as they are actually regenerated to drive either a television monitor or receiver (FIG. 2(C)), and jump back pulses (FIG. 2(D)). Frames scanned on the disc are designated by reference numeral 20, while frames provided as output signals are designated by reference numeral 22. The diagram depicts a sequence of play of frames of a given spiral track, designated arbitrarily as track "A". The immediately preceding track is therefore designated "A−1", and the subsequent track "A+1". The first field on a track is designated by "F1", the second field by "F2", and so forth. Field "F1" corresponds to original video Field "OV1", Field "F2" corresponds to original video Field "OV4", and so forth. Original video Fields "OV2", "OV3", "OV5", etc. are skipped, that is, not recorded.

The fields which are recorded on the disc correspond to one out of every three fields of a standard NTSC video format program segment. In playback, a field is read off of the disc 10, digitized, stored, and then read out of storage three times in a row and converted back into an analog signal as it is read out of storage. During the last readout of a field from storage, the next field on the disc is read into storage so that the process can continue uninterrupted in cyclical fashion.

The disc 10 is rotated at a rate such that the reading beam of laser light scans 1¼ rotations, or tracks, in the time it takes to play three fields of video at NTSC rate. Thus, referring now to FIGS. 2B and 2C, it can be seen that during the third and final playback of the fourth field of track "A−1", Field 1 (F1) of track A is being stored in memory. The sequencing is arranged such that the first field of track A is completely stored just as the readout of the fourth field of track A-1 is completed, or shortly thereafter.

It will be appreciated that five fields of video on the disc are scanned in the time that it takes to play back each stored field of video three times. It will also be appreciated that the special rotation rate of the disc mentioned above makes this overlapping timing scheme possible.

Proper scanning of the reading spot of laser light along the spiral track is assured by the implementation of a Jump Back signal 23, shown in FIG. 2(D), which causes the spot of light to jump back to the immediately preceding track, immediately following storage of each field of video.

Audio is stored on the disc with each field as three channels of audio information, similar to the scheme of audio channel storage which is described in U.S. patent application Ser. No. 314,910, now abandoned in favor of related application Ser. No. 146,819, now U.S. Pat. No. 4,353,090 issued Oct. 5, 1982. With each separate playback of a field of video, a different one of the audio channels is played along with that video. The combination of all three channels provides the complete audio information for the playing of all three fields.

It will be appreciated that whereas conventional CAV discs presently have only two fields per track, in order to fit four fields of video on each spiral of the track, bandwidth compression of the stored video and audio is required, if the same size and spacing indicia are to be employed. In fact, the preferred embodiment of the present invention contemplates a bandwidth compression of two to one. Many conventional bandwidth compression techniques are available and may be used for this purpose.

Figure 3:
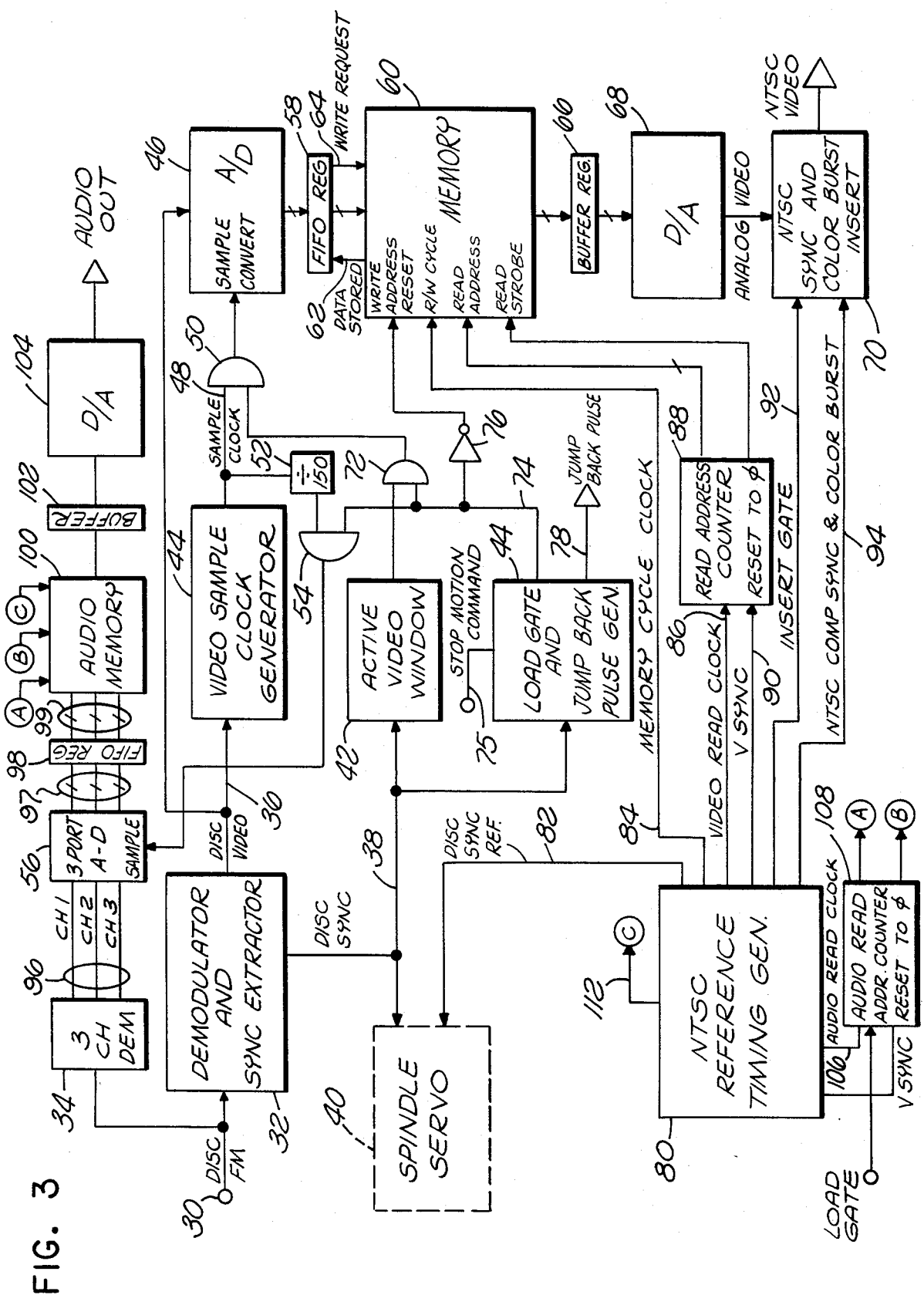
FIG. 3 is a block diagram of circuitry which can be incorporated in a conventional player to permit it to play the videodisc shown in FIG. 1.

FIG. 3 is a block diagram of circuitry constructed in accordance with the preferred embodiment of the present invention, usable in connection with a conventional videodisc player mechanism to permit playback of the optical videodisc shown in FIG. 1. The FM signal recovered from the disc is applied to a signal line 30, and is conveyed to a Demodulator and Sync Extractor 32 and to the input of a second, three channel Audio Demodulator 34. The Demodulator and Sync Extractor 32 demodulates the FM signal, and provides as outputs recovered Disc Video and Disc Sync, on lines 36 and 38 respectively.

It will be appreciated from the foregoing discussion that the timing of the Disc Video and Disc Sync is substantially equal to 5/3×NTSC rates. Thus, for example, the burst frequency of the Disc Video is approximately equal to 5.96 megahertz. Other rates, such as horizontal sync, follow the same proportion.

As in a conventional player, the Disc Sync on line 38 is applied to the Spindle Servo circuit of the disc player along with Disc Sync Ref, described below, and serves to ensure the proper rotation rate of the spindle, and thus of the disc, for the FM signal to be read off the disc at the proper rate. Disc Sync on line 38 is also applied to an Active Video Window Generator 42 and to a Load Gate and Jump Back Pulse Generator 44, both of which are discussed in further detail below.

Disc Video on line 36 is applied to a Video Sample Clock Generator 44 and to an A-D Converter 46. The Video Sample Clock Generator 44 generates a square wave Sample Clock signal at a rate equal to three times the burst frequency of the disc "color subcarrier", and phase locked to the burst signal. This Sample Clock signal is applied on line 48 to one input of an AND gate 50. The signal on line 48 is also applied to a Divide-By-150 device 52, the output of which is applied to one input of an AND gate 54. The output of AND gate 54 is applied to the SAMPLE input of a three port A/D Convertor 56, which is described in further detail below. The output of AND gate 50 is applied to the SAMPLE CONVERT input of A/D Converter 46.

The output of A/D Converter 46 is applied to a FIFO Register 58. The output of the FIFO Register 58 is applied to a Memory device 60. A handshake interconnection between register 58 and 60 is provided by way of Data Stored line 62 and Write Request line 64. The output of Memory 60 is connected to a Buffer Register 66, the output of which is connected to a Digital-To-Analog Converter 68. The output of D/A Converter 68 is applied to a Sync and Color Burst Insert circuit 70. The output of circuit 70 comprises recovered NTSC video.

The output of the Active Video Window Generator 42 comprises a series of pulses which are high during those portions of the Disc Video signal in which visual or data content video signals can occur, that is, excluding horizontal blanking intervals and that portion of the vertical blanking interval extending from line 1 through line 9. Although lines 10 through 20 of the vertical blanking interval do not contain visual content video information, they frequently do contain digitally encoded data signals. The output of circuit 42 is applied to one input of an AND gate 72, the output of which is connected to the other input of AND gate 50.

The Load Gate and Jump Back Pulse Generator 44 has two outputs. The first output, on line 74, is a Load Gate signal which is high only during the time when a field is to be read from the disc. It is applied to the other inputs of AND gate 54 and 72, and to the input of an Inverter 76, the output of which is applied to the WRITE ADDRESS RESET input of memory 60. The other output of generator 44 is a Jump Back pulse signal and is applied to line 78. This pulse is provided to the read spot jump back circuitry of the player which, in response thereto, causes the reading spot of laser light to jump back to the last preceding track, as is known in the art.

A Reference Timing Generator circuit 80 provides as an output a square wave reference pulse signal at the rate of the Disc Sync. This signal, Disc Sync Ref, is applied to line 82 which is connected to the Spindle Servo which utilizes it in the control of the rate of rotation of the spindle, as mentioned above. The Reference Timing Generator 80 also has an output, on line 84, which is the Video Memory Cycle Clock signal. This clock signal is a square wave pulse signal at the rate at which digital words are read out of Memory 60. During one third cycle of the clock the Memory 60 is enabled to read, while in the other two thirds of the cycle the Memory 60 is enabled to write, twice if necessary. In this way the Memory 60 is able to continue reading out the stored digital data during the last full field readout of that data, while at the same time reading into storage the digital data corresponding to the next field of video to be played. Such a Memory circuit 60 is known in the art.

Another output of Generator 80 is applied to a further line 86. This output is the Video Read Clock signal. This signal is also a square wave at the frequency at which digital data is read out of Memory 60. Line 86 is applied to the input of a Read Address Counter 88, which in response thereto counts cyclically from zero. The count output of counter 88 is applied to the READ ADDRESS input of Memory 60.

Generator 80 also provides as an output a vertical sync pulse signal ("V Sync") at NTSC rate, which is applied on line 90 to the RESET input of Counter 88.

Generator 80 also provides as an output, on line 92, a series of pulses corresponding to those portions of video omitted through the action of the Active Video Window 42. This output is the Insert Gate pulse signal.

Generator 80 also produces NTSC Comp Sync and Color Burst, which are output on a further line 94. Lines 92 and 94 are applied to the Sync and Color Burst Insert circuit 70, wherein the NTSC Comp Sync and Color Burst signals are inserted into the Analog Video from the Digital-to-Analog Converter 68.

The Disc FM on line 30 is, as mentioned above, applied to a three channel Demodulator 34. This Demodulator 34 demodulates the three audio channels mentioned previously and applies them separately on three different lines 96 to the three port A/D Converter 56 mentioned above. Each of the three channels of audio is digitized by A/D Converter 56 and the separate outputs thereof are applied by way of lines 97 to a FIFO Register 98. The output of the FIFO Register 98 is applied to the input of an Audio Memory 100, which is analogous to Memory 60. The output of Audio Memory 100 is applied to a Buffer Register 102, the output of which is applied to a Digital-to-Analog Converter 104. The output of D/A Converter 104 comprises the audio output.

Timing Generator 80 provides as an output an Audio Read Clock signal pulse on a line 106 which is applied to the COUNT input of an Audio Read Address Counter 108. Likewise, the load gate signal conditions the next reset to also reset the channel port of the READ ADDRESS to the first channel so that the audio channels may be properly sequenced for readout. V Sync is applied to the RESET input of Counter 108. The COUNT output of Counter 108 is applied to the READ ADDRESS input of Audio Memory 100, while the square wave output of Counter 108 is applied to the READ STROBE input of Audio Memory 100.

Timing Generator 80 also has as an output on line 112 an Audio Memory Cycle Clock signal. This signal, like the Read Write Cycle signal on line 84 provides for interlaced writing and reading.

The circuit shown in FIG. 3 operates as follows. The Disc FM on line 30 is applied to the Demodulator and Sync Extractor 32 which extracts Disc Sync and applies it on line 38 to the Spindle Servo 40 along with the Disc Sync Reference signal on line 82, as mentioned above. The Disc Video is applied on line 36 to the Video Sample Clock Generator 44 which generates a Sample Clock referenced to the burst frequency of the Disc Video. The Disc Sample Clock signal is gated through AND gate 50 and applied to the Sample Convert input of A/D Converter 46. The arrangement of Load Gate and Jump Back Pulse Generator 44, Active Video Window Generator 42, AND gate 72 and AND gate 50 cause the Sample Clock pulses on line 48 to be applied to the A/D Converter 46 only during those portions of active video when the reading beam of laser light in the player is scanning a field to be read and stored.

FIG. 4 aids in understanding the timing described in connection with the SAMPLE CONVERT input of A-D converter 46. FIG. 4 (A) is a signal diagram showing the output of the Active Window Generator 42. As can be seen, the signal is low during pulses 200, corresponding to horizontal blanking intervals, and from the beginning of vertical blanking through line 9 within the vertical blanking interval.

FIG. 4 (B) shows the output on line 74 from the Load Gate and Pulse and Jump Back Pulse Generator 44. That output is high during the entire time in which a field of video is read off of the disc 10 (FIG. 1). The Jump Back Pulse output on line 78 is identical to that on line 74, with the difference that when a stop motion command is received on line 75 the output on line 74 is disabled, and only the Jump Back pulse output is provided. Details of the circuitry in the load gate and jump back pulse generator are provided below in connection with FIG. 6.

FIG. 4 (C) shows that the Video Sample Clock Generator output is a continuous series of pulses at three times the rate of the Disc Video "color subcarrier" burst frequency.

The SAMPLE CONVERT input of A/D Converter 46 is shown in FIG. 4 (D).

Digital words are generated in the A/D Converter 46 at the rate the pulses are provided to the SAMPLE CONVERT input thereof, and are applied to FIFO Register 58. From FIFO Register 58 they are loaded in a conventional handshake operation into memory 60, as memory write time becomes available. Memory 60 has an internal write address generator which operates in conjunction with the handshake operation just described, and the internal write address is reset to zero following the complete storage of a field. The digitized words of video information are thus stored sequentially in memory 60 starting with address zero.

The combination of the Reference Timing Generator 80 and Read Address Counter 88 cyclically generate a series of pulses for Memory 60 readout corresponding to the pulses controlling the Memory 60 write operation, however bearing a timing relationship thereto of 5 to 3, and synchronized so that the zero address of the Read Address Counter 88 is generated before the last word of digitized data is converted by A-D Converter 46. A slight delay will occur before the last word of digitized data is stored into Memory 60 following the last conversion of that video data, due to the time sequence in the storage into register 58 and the above-described handshake operation to store the digitized data into memory 60. This does not, however, affect the performance of the system, but rather provides "slack" to the system and thereby helps to relieve the criticality of the relative timing between writing and reading to and from memory 60.

It will be appreciated that the continuous recycling of memory 60 allows for a "freeze-field" video picture image to be maintained, even when the player is "searching" or "seeking" a new track of data and cannot write new data into Memory 60. It will also be appreciated that because the Video Sample Clock Generator 44 is phase locked to the Disc Video burst signal frequency, and the Read Clock is referenced to generator 80 which generates NTSC synchronized signals, that the circuit of FIG. 3 provides automatic time base correction intrinsically in the process of sampling, storage, and readout. In fact, no further time base correction should be necessary for most purposes.

FIG. 4 (E) shows the read clock output signal.

The D/A Converter 68 converts the digital output from Memory 60, buffered by way of Buffer Register 66, into analog video. Because of the gating action of the Active Video Window Generator 42 and AND gates 72 and 50, the converted analog video output from D/A Converter 68 has "holes" in it during the horizontal blanking intervals and a portion of the vertical blanking interval. The insert gate signal on line 92 is a series of pulses corresponding to those "holes". They provide windows for the Sync and Color Burst Insert circuit 70 during which NTSC comp sync and color burst on line 94 are inserted in those holes in a conventional manner.

An analogous process of demodulation, storage and readout is performed by the circuitry comprising Demodulator 34, A/D Converter 56, FIFO Register 98, Audio Memory 100, Buffer Register 102, and D/A Converter 104. Sampling is done at a rate 150 times slower than that of the video sampling, by virtue of Divide-By-150 device 52. The Sample Clock is gated against the load gate output from Generator 44, by way of AND gate 54. However, since the audio is "active" throughout the field, no window generators are provided, nor are any reinsert circuits provided. In readout, Audio Memory 100 simply cycles cyclically through the digitized stored audio data of channels 1, 2, and 3, respectively.

FIG. 5 is a signal diagram which aids in understanding the relationship of signals utilized in connection with the audio recovery and playback function of the circuit shown in FIG. 3. FIG. 5(A) shows the Load Gate signal found on line 74. FIG. 5(B) represents the Sample Clock output from device 52. FIG. 5(C) shows the output of AND gate 54 which is applied to the three part A/D Converter 56. It will be appreciated that the signal represented in FIG. 5(C) is merely the Divide-By-150 52 output gated against the Load Gate output on line 74.

FIG. 5(D) shows the Audio Read Clock which is a continuous pulse train provided at a frequency substantially equal to 3/5 times the Divide-By-150 52 Sample Clock output shown in FIG. 5(B), approximately 70 kHz.

Figure 6:
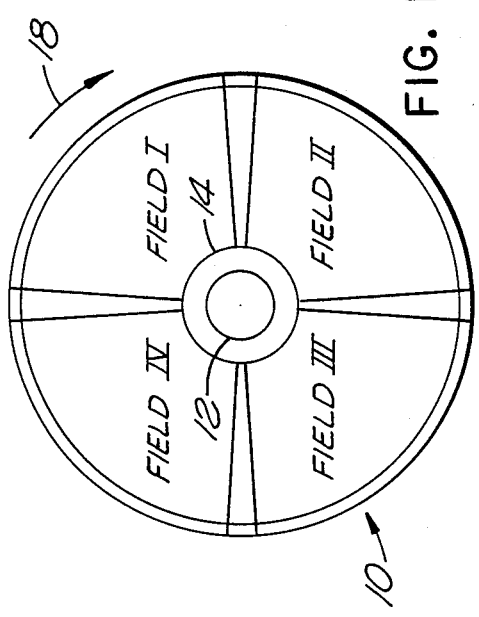
FIG. 6 is a block diagram of a portion of the circuitry shown in FIG. 3.

FIG. 6 is a circuit diagram of the Load Gate and Jump Back Pulse Generator circuit 44 of FIG. 3. Line 38, which carries Disc Sync from the Demodulator and Sync Extractor 32 (FIG. 3) is applied to the input of a Vertical Sync Extractor 202. The output of the Vertical Sync Extractor 202 is applied to a Count-To-Four Counter 204. Line 75, carrying the stop motion command signal, is connected to the LOAD VALUE input of Counter 204, and to the input of an Inverter 206. The output of Inverter 206 is connected to the input of an AND gate 208. The Carry output of Counter 204 is connected to the other input of AND gate 208 and to the LOAD ENABLE input of Counter 204. The output of AND gate 208 comprises line 74, and the Carry output of Counter 204 comprises line 78.

In operation, the circuit shown in FIG. 6 operates as follows. V-Sync is extracted from the Disc Sync on line 38 and is applied as a pulse input to Counter 204. In the absence of a stop motion command signal, line 75 is low, and consequently Counter 204 counts from zero up to four, i.e., a count of five. With line 75 low, the output of Inverter 206 is high, and thus the Carry output of Counter 204 is passed directly to line 74. The signal contents of lines 74 and 78 are thus substantially identical, as mentioned above.

With each pulse output at the Carry output of Counter 204 the LOAD ENABLE input of Counter 204 is activated and the value on line 75 is loaded into the counter. If a stop motion command is present on line 75, the load value is a 1. In that case, Counter 204 is thus a four count counter, and Inverter 206 provides a low level signal to one input of AND gate 208, thus blocking an output from line 74, yet providing for a trip back once around each revolution of the disc, keeping it from advancing to new tracks.

It will be appreciated that the invention described herein represents a significant advance in the field of video recording generally, and more particularly in videodisc recording and reproducing systems. The invention provides for the production of disc video programs with significantly longer program times than would otherwise be obtainable, and makes efficient use of the storage space on a disc by eliminating redundant video information from the original program, all without significant loss of program content. In addition, it provides a similar technique for recording a continuous audio information signal, and recreating the continuous audio signal during the reproduction phase. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A method of displaying video information recorded on a storage medium, comprising the steps of:
   a. reading a first segment of video information from the medium during a first period of time;
   b. repetitively outputting the first segment of video information during a predetermined number of consecutive second periods of time, each of said second periods of time being longer than said first period of time;
   c. reading a further segment of video information from the medium simultaneously with a portion of the last of the predetermined number of second periods of time during which the first segment of video is being outputted; and
   d. functionally repeating steps b and c for each video information segment read.

2. The method as claimed in claim 1, wherein said reading steps include the step of storing the video information at a first rate and said outputting step includes the step of recalling the stored video information at a second rate which is slower than the first.

3. The method as claimed in claim 1, wherein said storage medium is a videodisc having substantially circular concentric tracks of video information thereon, and said reading steps include scanning a portion of one of the tracks of the disc, the rate of scanning being chosen such that the output time for a segment of video information which output time is equal to the predetermined number of times the segment is outputted times the length of each of the second periods of time, is also equal to the time required to scan all of the segments of video information in one substantially circular track plus one additional segment of video information.

4. The method as claimed in claim 3, wherein a segment is a field of video information, each field is output three consecutive times, and each track of the disc includes four fields of video information, five fields of information being scanned during the time required to output a field three times.

5. The method as claimed in claim 4, further comprising the step of initially recording every third field of a video program on the storage medium.

6. Improved long play videodisc, comprising a disc base of the type suitable for the recording thereon of a plurality of tracks of indicia representing video signals, said disc having recorded thereon a plurality of fields of video signal in each track, each field being noncontiguous with each of the fields adjacent thereto along the track.

7. The videodisc as claimed in claim 6, wherein there are n fields of video recorded on each track of the disc and the fields are every m th field of a video program, the video signals and video sync signals being recorded at $(n+1)/m$ times their standard speed.

8. The videodisc as claimed in claim 6 or 7, wherein there are four fields recorded in each track of the disc and the fields are every third field of a video program.

9. Improved long play videodisc playback apparatus, for playing a videodisc having recorded thereon a plurality of tracks, wherein a plurality of fields of video is recorded in each track, each field being noncontiguous with each of the fields recorded adjacent thereto, comprising:
   means for reading said recorded video fields from said disc;
   memory means for storing video signals;
   means for storing said read video fields individually in said memory means;
   means for recalling said stored video fields from said memory means, said recalling means recalling said stored video fields from said memory means repeatedly a predetermined number of times, said storing means beginning storing the next field of video prior to the completion of the last recalling of a field.

10. The playback apparatus as claimed in claim 9, further including means to rotate the videodisc such that said means for reading passes over an entire track of the disc plus one field during the time that a single field is being repeatedly read from said memory means.

11. The playback apparatus as claimed in claim 10, wherein said recall means recalls stored video fields at a slower rate than said means for storing stores the video fields.

12. The playback apparatus as claimed in claim 11, wherein said means for reading and said means for storing are active only during a portion of the final recalling of a field.

13. The playback apparatus as claimed in claim 12, wherein each track on the disc includes four fields and said reading means reads every fifth field to thereby read each field in order and at intervals of one and one-quarter revolutions of the disc.

14. The playback apparatus as claimed in claim 12 or 13, wherein said means for recalling recalls each field three times over a period equal to one and one-quarter revolutions of the disc.

15. The playback apparatus as claimed in claim 9, wherein:
said memory means is a digital signal memory;
said means for storing includes an analogue to digital converter and means for clocking the digital signal into the digital memory at a first rate; and
said means for recalling includes a digital to analogue converter and means for clocking the digital signal out of the memory at a second rate, said second rate being slower than said first rate.

16. The playback apparatus as claimed in claim 9 for playing discs having n fields per track, further comprising means for activating said means for reading and said means for storing for only 1/n th of the period of each revolution of the disc and only after each one and 1/n th revolution of the disc, to thereby read and store a new field every one and 1/n th revolution of the disc.

17. The playback apparatus as claimed in claim 9, further comprising:
means for selectively recovering a number of separate audio tracks, the number of audio tracks being at least equal to the predetermined number of times each field of video information is recalled from said memory means; and
means for selecting a particular different one of the audio tracks each time a field is recalled from said memory means.

18. A videodisc playback apparatus for playing video information recorded in sequence in a plurality of substantially concentric tracks on a disc comprising:
means for sequentially playing contiguously positioned segments of the video information spaced by nonplay periods equal to the period of revolution of the disc;
means for storing a played segment of video information;
means for outputting the stored segment of information a plurality of times for a period of time equal to the period of revolution of the disc plus the time required to read a further segment of video information from the disc.

19. The videodisc playback apparatus as claimed in claim 18, wherein each segment is a video field.

20. The videodisc playback apparatus as claimed in claim 18 or 19, wherein said means for playing and said means for storing play and store a segment of video information in a first period of time, and said means for outputting recalls the stored segment and outputs it during a second period of time which is after said first period of time and longer than said first period of time.

21. A method of displaying video information recovered from a recorded videodisc, wherein the videodisc has substantially circular concentric tracks of video information therein, the video information being recorded along said tracks as a series of noncontiguous fields representing every Nth field of a standard video signal, said method comprising the steps of:
a. reading a first field of said recorded information at a first relatively high rate;
b. displaying said first field of recorded information on a video monitor a plurality M of times at a second relatively low rate;
c. reading another field of said recorded information at said first rate before the last of said M times in step b is completed; and
d. repeating steps b and c a number of times necessary to play out a desirable amount of recorded video information.

* * * * *

UNITED STATES PATENT AND TRADEMARK OFFICE
CERTIFICATE OF CORRECTION

PATENT NO. : 4,519,004

DATED : May 21, 1985

INVENTOR(S) : Richard L. Wilkinson, Gary M. Giddings

It is certified that error appears in the above-identified patent and that said Letters Patent are hereby corrected as shown below:

Column 9, Line 54 - delete "medium simultaneously with a portion of the last of the".

Signed and Sealed this

Twenty-ninth Day of October 1985

[SEAL]

Attest:

DONALD J. QUIGG

Attesting Officer

Commissioner of Patents and Trademarks—Designate